United States Patent [19]

Oakes et al.

[11] Patent Number: 4,827,088

[45] Date of Patent: May 2, 1989

[54] ELECTRICAL RING MAIN UNIT

[75] Inventors: Martin C. Oakes; Graham D. Scully; Michael Adams, all of Leeds, England

[73] Assignee: Y.S. Securities Limited, Leeds, England

[21] Appl. No.: 166,677

[22] Filed: Mar. 11, 1988

[30] Foreign Application Priority Data

Mar. 12, 1987 [GB] United Kingdom ............... 8705885

[51] Int. Cl.$^4$ .................... H02B 1/14; H02B 1/16
[52] U.S. Cl. .................... 200/18; 200/50 C; 200/148 D; 200/307; 361/335
[58] Field of Search ............... 200/5 R, 18, 50 C, 307, 200/144 R, 145, 148 D; 361/335, 341, 343, 344, 393, 394, 396

[56] References Cited

U.S. PATENT DOCUMENTS

| 4,175,221 | 11/1979 | Kellogg | 200/18 |
| 4,245,137 | 1/1981 | Harai | 200/18 |
| 4,255,633 | 3/1981 | Johnston | 200/18 |

FOREIGN PATENT DOCUMENTS

| 395088 | 7/1933 | United Kingdom . |
| 618558 | 2/1949 | United Kingdom . |
| 2038100 | 7/1980 | United Kingdom . |
| 2044538 | 11/1980 | United Kingdom . |
| 2091942 | 8/1982 | United Kingdom . |

Primary Examiner—Gerald P. Tolin
Attorney, Agent, or Firm—Henry Sternberg; Bert J. Lewen

[57] ABSTRACT

A three-phase electrical ring main unit comprising a lower chamber module (30) having a wall structure formed from insulating resin material; three input contacts (35), one for each phase, mounted within the lower chamber; three lower switching contacts (37), each mounted within the lower chamber for movement between different switching positions; insulating closure means (55) closing the top of the lower chamber; three output contacts (49), one for each phase, carried by and exposed on a lower face of the closure means; three busbar contacts (59 to 61), each electrically connected to a respective output contact, carried by and exposed on an upper face of the closure member (55); an upper chamber module (31) having a wall structure formed from insulating resin material; means (32) securing the upper chamber above the lower chamber; three tee-off contacts (85), one for each phase, mounted within the upper chamber; and three upper switching contacts (83), each mounted in the upper chamber for movement between different switching positions; one switching position of the lower switching contacts effecting electrical connection between the input contacts and their associated output contacts; and one switching position of the upper switching contacts effecting electrical connection between the busbar contacts and their respective tee-off contacts.

10 Claims, 5 Drawing Sheets

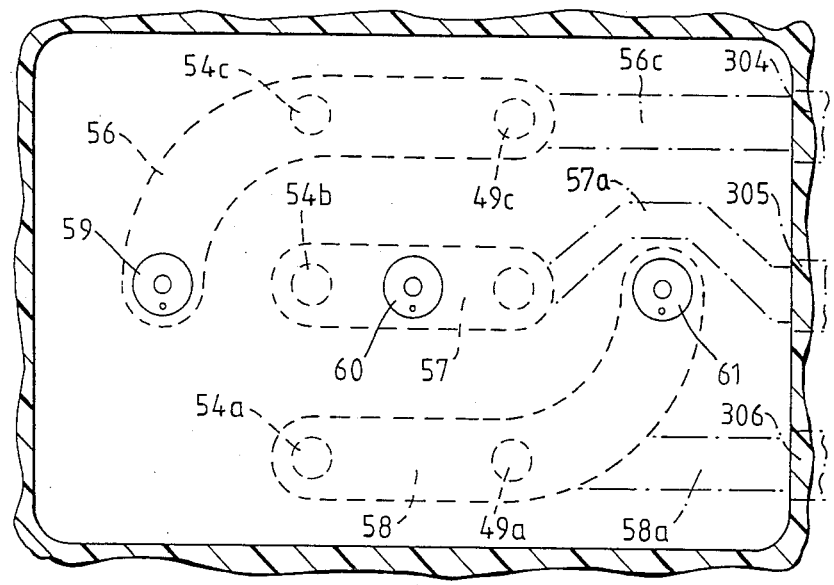

ELECTRICAL RING MAIN UNIT

This invention relates to an electrical ring main unit, and particularly to the housing and switchgear of such a unit. Many types of electrical switchgear are known for use in the power distribution industry, and particularly for ring main equipment.

One known type of three-phase ring main unit comprises a unitary tank having upper and lower sections. Ring main cables enter the lower section of the tank, which section houses switch means capable of connecting terminals of those cables either to earth contacts or to a set of busbar contacts. The upper section of the tank houses a further switch unit for connecting the busbar contacts to contacts of a three-phase tee-off circuit, the further switch unit having associated means for extinguishing arcs that are struck when the contacts thereof are opened. The arc extinguishing means includes, for each phase, a coil that is connected in circuit when the contacts open, arcing current then flowing through the coil to create a magnetic field capable of rotating the arc in order to assist extinction thereof. The whole of the tank is filled with an electrically insulating fluid, such as sulphur hexafluoride ($SF_6$) gas.

Drive means are provided for driving the switch means in the lower section of the tank between closed, open and earth positions, and drive means are also provided for driving the further switch unit in the upper section of the tank between open and closed positions. The latter movement may be under the control both of a manually-operated mechanism and of a tripping mechanism that is responsive to fault current on any phase in order to open the switches to the tee-off circuit. It is also common for the further switch unit in the upper section to be capable of moving to make earth connections.

Assembly of the switch units in the tank is complex, and access to them when assembled is restricted. The arrangements tend to be cumbersome and the invention seeks to provide a switchgear arrangement that is compact, improves assembly and access, makes possible the simplification of drive means to the switches and provides a unit that is more readily extensible than existing arrangements.

According to the invention a three phase electrical ring main unit comprises a lower chamber module having a wall structure formed from insulating resin material; three input contacts, one for each phase, mounted within the lower chamber; three lower switching contacts, each mounted within the lower chamber for movement between different switching positions; insulating closure means closing the top of the lower chamber; three output contacts, one for each phase, carried by and exposed on a lower face of the closure means; three busbar contacts, each electrically connected to a respective output contact, carried by and exposed on an upper face of the closure member; an upper chamber module having a wall structure formed from insulating resin material; means securing the upper chamber above the lower chamber; three tee-off contacts, one for each phase, mounted within the upper chamber; and three upper switching contacts, each mounted in the upper chamber for movement between different switching positions; one switching position of the lower switching contacts effecting electrical connection between the input contacts and their associated output contacts; and one switching position of the upper switching contacts effecting electrical connection between the busbar contacts and their respective tee-off contacts.

This division of the housing into upper and lower chamber modules allows much easier assembly of, and access to, switches within the assembly. Preferably the insulating closure means is a base formed integrally with wall structure of the upper chamber module, and closing an open top of the lower chamber module when these modules are secured together. Although the open top of the lower chamber module could be closed by a lid that is a separate unit, or even by a part integral with the remainder of the lower module, this two-module stacking arrangement affords optimum manufacturing and assembly. The upper chamber module may simply have an open top closed by a lid secured to that module. Thus, prior to assembly, each module has an open top so giving very easy access to the equipment contained therein.

Preferably each chamber module is cast from a suitable insulating resin, and the outer surface of the wall structure of each module may be screened by a conductive coating applied thereto. The coating may be sprayed on to the wall surface, and may, for example, be of metal or of a plastics material filled with conductive particles such as zinc, aluminium, nickel, silver or carbon.

Desirably the input contacts have axes that are substantially parallel and lie in a first plane, the output contacts have axes that are substantially parallel and lie in a second plane substantially perpendicular to the first plane, the busbar contacts have axes that are substantially parallel and lie in a third plane substantially perpendicular to the second plane and at an angle to the first plane, and each busbar contact is electrically connected to its respective output contact by a busbar moulded in situ in the closure means.

This use of different planes for the axes of the various contacts enables particularly compact units to be made, and in particular reduces the size of the ring main unit. This is of particular cost and technical advantage when the chambers are to be filled with an insulating medium such as $SF_6$ gas.

It also facilitates the arrangement of drive means for the various switches, and allows construction of a unit that is more readily extensible than existing units.

A ring main unit embodying the invention will now be described in more detail, by way of example only, with reference to the accompanying drawings in which:

FIG. 5 is a section on line V—V of FIG. 3; and

FIG. 6 is a section on the line VI—VI of FIG. 4;

Figure 1:
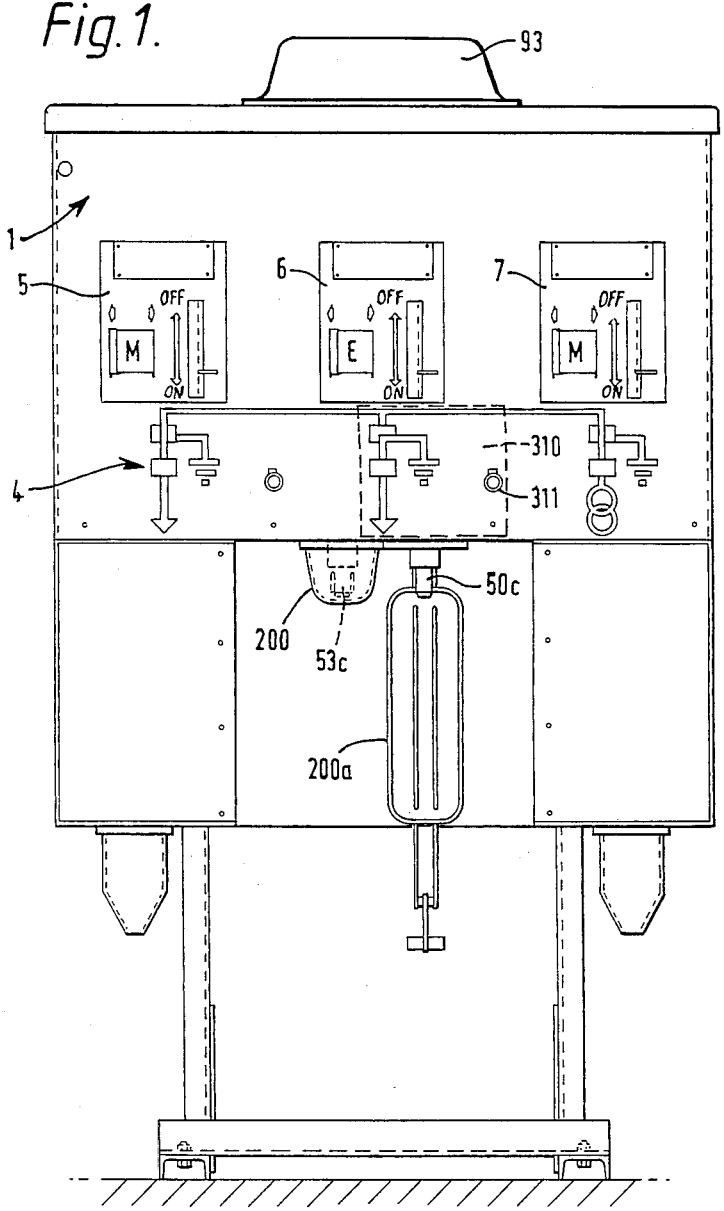
FIG. 1 is a front view of a casing of a ring main unit.
Figure 2:
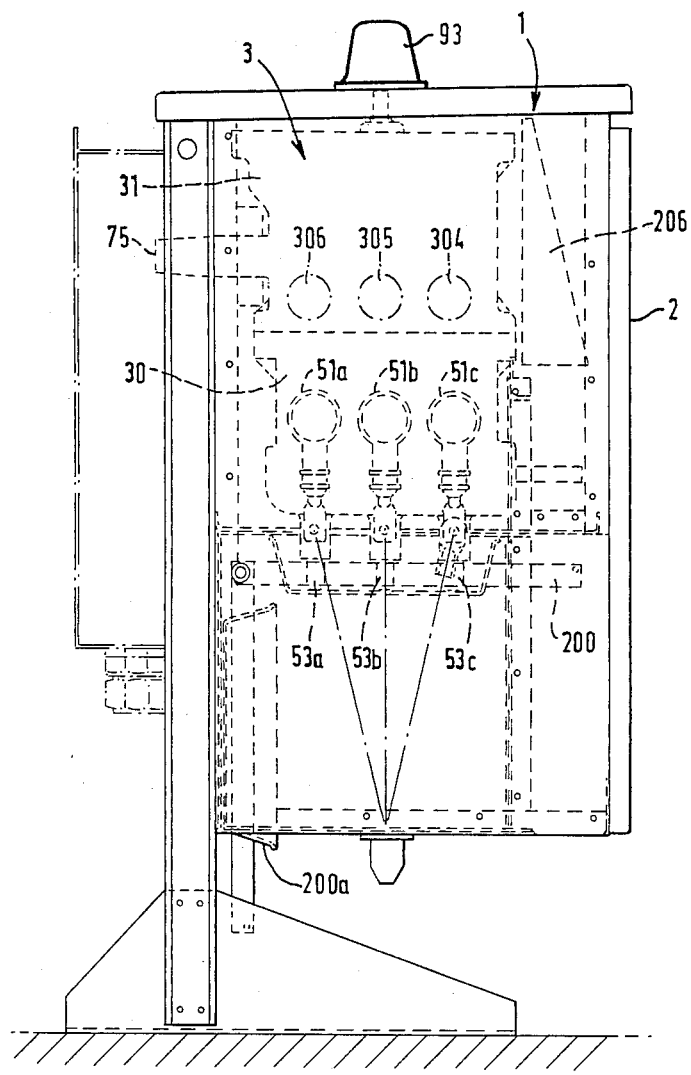
FIG. 2 is a side view of part of the casing.

Referring first to FIGS. 1 and 2, these show the casing 1 of a three-phase ring main unit, the front of the casing being closable by a door 2 that can be locked in the closed position. The casing is designed to be weatherproof and vandal-resistant, and can be fitted with external fixings that can not be released by conventional tools. Sealing means are associated with the door so that weatherproofing is maintained even in the door area. Supported in the upper part of the casing is a tee-off circuit breaker/earth switch housed in the upper module of a two-module cast resin chamber 3, and two ring switches housed in the lower module of the chamber.

The ring switches and circuit breaker are fault-making, load-break switches, and the earth switches are fault-making switches. A control console of the casing incorporates a mimic diagram 4 and has switch control panels 5 and 6 for operating the respective ring switches and a switch control panel 7 for controlling the tee-off circuit breaker/earth switch.

The panels each incorporate means for selecting either a main or an earth switch, and for moving the selected switch between on and off positions. They are shown in the condition wherein the main switches (M) are selected for operation on panels 5 and 7, the earth switch (E) is selected for operation on panel 6, and all three selected switches are in the on position. This information is shown on the mimic diagram below the control panels.

The casing also includes three operating mechanisms 206 for the ring switches and the circuit breaker, arranged side by side along the front of the chamber 3, but not shown in any detail. The mechanisms are controlled from the panels 5 to 7, and the circuit breaker is also under the control of a mechanism responsive to detection of a fault on the circuit. Many different types of fault detector are known, and can be used to trip the circuit breaker as necessary. Reset means will also be provided.

Figure 3:
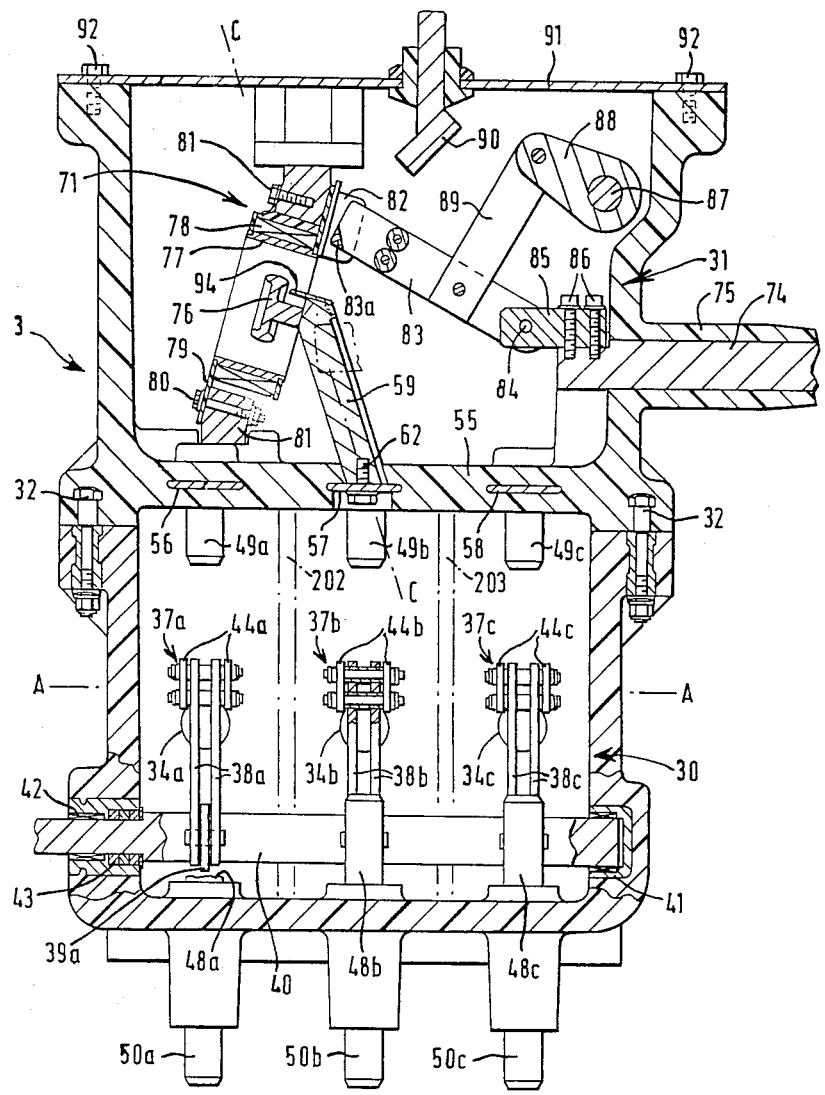
FIG. 3 is an end view of a ring main unit incorporated in the casing of FIGS. 1 and 2.
Figure 4:
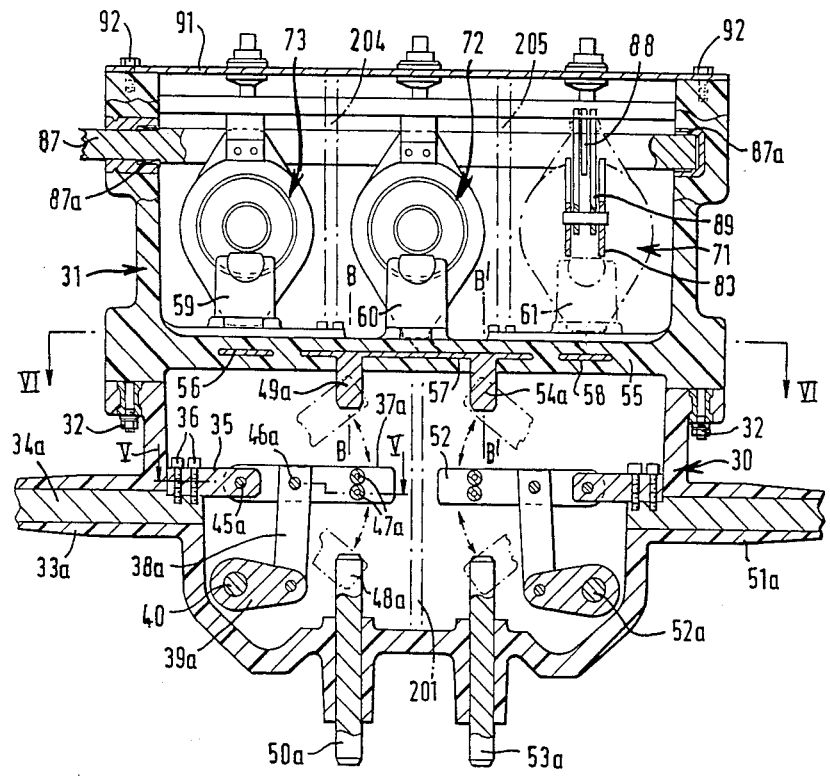
FIG. 4 is a front view to a reduced scale of the unit of FIG. 3.

FIGS. 3 to 5 show the tee-off circuit breaker/earth switch and ring switch units in more detail. The chamber 3 is formed by a lower chamber module 30 and an upper chamber module 31, the two modules being mounted one on top of the other and being secured together by nut and stud arrangements such as 32. Each module is cast from or moulded in a suitable insulating resin, and the exposed outer surfaces of the modules are sprayed with a conductive coating so as to provide electrical screening. Suitable sealing means are located between the two modules, and the whole of the free space within each module is filled by an electrically insulating medium, usually $SF_6$ gas. A base 55 of the upper module is formed integrally with the wall structure of that module, and closes the open top of the lower module.

The lower module has a first set of three tapered input bushes such as 33a moulded integrally therewith, one for each phase of a first three-phase electrical supply. Conductors 34a, 34b, 34c of the supply pass through respective ones of the bushes to terminate within the lower chamber. The axes of the bushes and conductors are all parallel. Each of the conductors 34 has an input contact such as 35 secured to its inner end by bolts 36, and each input contact pivotally supports a switching contact 37a, 37b, 37c respectively. The axes of the input contacts lie in a plane A—A, parallel to the plane in which the axes of the bushes and input conductor lie.

Each of the switching contacts 37a, 37b, 37c is connected by a respective link 38a, 38b, 38c, each formed by two parallel arms of insulating material, and a respective lever arm such as 39a, to an operating shaft 40, all three switching contacts thus being driven from the same operating shaft. The shaft is supported by suitable bearings 41, 42 in the module 30, and sealing means 43 are located around the shaft where it leaves the module.

Each switching contact 37a, 37b, 37c comprises two parallel electrically conductive arms 44a, 44b 44c respectively, supported on the respective input contact by a pivot pin such as 45a (FIG. 5) and connected by a further pivot pin such as 46a to the respective link 38a, 38b or 38c. Spring washers are positioned between nuts threaded on to the ends of the pivot pin 45a and the arms 44a to ensure good electrical contact between the arms and the contact 35a. Towards their free ends each pair of arms 44a, 44b, 44c are biased together by spring assemblies such as 47a, each acting between a respective arm and a nut threaded onto the end of a bolt extending between the two arms.

The switching contacts 37a, 37b, 37c are shown in the off position in solid lines in FIG. 4, and they can be driven by rotation of shaft 40 either downwardly into connection with respective earth contacts 48a, 48b, 48c or upwardly into contact with respective output contacts 49a, 49b, 49c. The earth contacts are moulded in situ in the lower module and extend through a lower part thereof to leave exposed conductive sections 50a, 50b, 50c which can be connected to a star point earth contact or, if appropriate interlocks are embodied, to a test circuit as required.

A second set of three tapered input bushes 51a, 51b, 51c and appropriate conductors, one for each phase of a second three-phase electrical supply, is associated with the lower module at the opposite side thereof, the arrangement being substantially a mirror image of the switching arrangement associated with input conductors 34a, 34b, 34c. Thus, each conductor has an associated switching contact such as 52 driven from an operating shaft 52a so that it can adopt a central off position, a lower on position in contact with a respective one of three earth contacts 53a, 53b, 53c or an upper on position in contact with a respective one of three output contacts 54a, 54b, 54c. The lower chamber thus houses two three-phase ring switches each capable of connecting a respective set of three input contacts to a respective set of three output contacts. Each switch is driven from a separate shaft, 40 or 52a, which is in turn driven by an operating mechanism 206 under control of the respective switch control panel 5 or 6.

Each set of earth contacts is enclosed by a star point cover 200, 200a (FIG. 1) pivotally mounted on the casing. Star point interlocks of any suitable form control opening of the covers to allow removal of the contact. One way of controlling a suitable interlock is to apply to the front of the casing a cover plate 310, shown in dotted outline in FIG. 1, the plate having an axially captive key engageable in a keyhole 311 in the casing. When properly positioned, the key may be turned to lock the plate in position and release the interlock for the star point cover. The plate will cover the appropriate point of the mimic diagram and display a test symbol.

An insulating barrier plate 201 may optionally be secured in the module 30 between the switching cotacts 37 and 52, and insulating phase barriers such as 202, 203 may optionally be secured in the housing between switching contacts of adjacent phases of the same switch.

The output contacts 49 and 54 are all moulded in situ in the base 55 of the upper module 31, and they are joined by busbars 56, 57, 58 to three busbar contacts 59, 60, 61 projecting upwardly from the upper surface of the base 55, and secured by bolts such as 62 to the respective busbars. It will be seen that the axes of the output contacts 49 are parallel and lie in a plane B—B that is perpendicular to the plane A—A, and also that the axes of the busbar contacts 59 to 61 are parallel and lie in a third plane C—C that is perpendicular the plane B—B and lies at an angle (as shown about 80°) to plane A—A. Similarly, the plane B'—B' of the axes of the output contacts 54 is parallel to the plane B—B, and so perpendicular to the planes A—A and C—C. The busbar contacts 59 to 61 are located in line in the upper chamber in an optimum position for efficient mounting and location of a three-phase tee-off circuit breaker-/earth switch assembly in the upper chamber.

The tee-off circuit breaker/earth switches of the three phases are indicated generally at 71 to 73 in FIG. 4, and only switch 71 will be described in detail, it being understood that the other two switches are similar, although they operate between different ones of the busbar contacts 59 to 61 and different outlet conductors. Switch 71 (FIG. 3) is capable of connecting busbar contact 59 to an outlet conductor 74 passing through a tapered bushing 75 moulded integrally with the upper module. The busbar contact 59 is connected to an arcing electrode 76 having a substantially circular periphery. The arcing electrode is located within, and coaxial with, a conductive ring 77 around which is located a coil 78 held on an insulating support 79. The support is secured in position within the housing by bolts 80 fixed to appropriate brackets 81 within the housing. One end of the coil winding is electrically connected to the ring 77, and the other end of the coil winding is electrically connected to an auxiliary contact 82, spaced apart from the busbar contact 59.

It will be particularly noted that the coil 78 and its mounting is a self-contained assembly without any permanent electrical connection. Individual coil arrangements can thus be pre-assembled, or a sub-assembly including coils for all three phases can be pre-formed. Coil construction and fitting can thus be simplified.

A switching contact 83 is pivotally mounted at 84 on a tee-off contact 85 secured by bolts 86 to the outlet conductor 74. The switching contact can be driven from an operating shaft 87, supported by bearings 87a, by a lever arm 88 and linkage 89 between an off position where the switching contact connects the auxiliary contact 82 and the tee-off contact 85, and an on position wherein the switching contact connects the busbar contact 59 and the tee-off contact 85. In addition, the switching contact may be driven in the opposite direction from the auxiliary contact 82 into engagement with an earth contact 90, so that the switching contact then connects the earth contact and the tee-off contact 85. The switching contacts 83 of all three phases are driven in unison from a common shaft 87, which is in turn driven by an operating mechanism 206 under control of the switch panel 7, or by tripping in response to a detected fault.

Each switching contact 83 comprises two parallel conductive links, and each linkage 89 comprises two parallel insulating links pivoted to the conductive links. The conductive links have tungsten-copper insets 83a at their free ends. Each busbar contact 59 and earth contact 90 is of T-shaped cross-section, and the conductive links of the switching contact are designed to engage the edges of the flanges of the T-sections.

The earth contact 90 passes through an insulating bushing carried by the lid 91 closing the open top of the upper module and secured thereto by bolts such as 92. The three earth contacts 90 may be enclosed by a star point cover 93 incorporated in the top of the casing 1.

Phase insulating barriers 204, 205 may optionally be located between the switching members of adjacent phases.

It will be particularly noted from a comparison of FIGS. 3 and 4 that each switching contact (apart from the hardened tips), its pivot and its driving means is of identical construction for each tee-off switch in the upper chamber and for each ring switch in the lower chamber. This leads to clear manufacturing advantages.

Operation of the ring main unit will readily be understood. In the on condition, either or both of the three-phase inputs is or are connected by its switching contacts 37 and/or 52 in the lower chamber to the respective set of output contacts 49 or 54, and so to the busbar contacts 59 to 61. The switching contacts 83 in the upper chamber engage the busbar contacts 59 to 61 to connect them to respective tee-off contacts 8 and current flows through the unit. That current may be switched off by returning appropriate switching contacts 37, 51 to the off positions shown in solid lines in FIG. 4. Either set of three-phase inputs may, from the off position, be connected to earth by downward movement of the switching contacts 37 or 51, and thereafter, following operation of suitable interlocks, may be connected to appropriate test circuitry connected to the earth contacts.

Reverting to the on condition, however, if fault current is experienced on one of the three phases, then a fault current sensing device will operate and will cause tripping of a mechanism attached to shaft 87 so that such shaft is rotated clockwise from the on position of each switching contact 83, shown in broken lines in FIG. 3, to the off position wherein contact 83 engages the auxiliary contact 82. During such movement, an arc is struck between the movable switching contact 83 and the busbar contact 59, one arc root being located on a tungsten-copper plate 94 extending towards the arcing electrode 76, and the other arc root being located on the hardened inserts at the tips of the switching contact 83. The effect of magnetic loop forces on the arc will cause the arc root on the plate 94 to migrate along the plate and onto the electrode 76, while the other root of the arc migrates onto the inner surface of the conductive ring 77. With the arc in this position, arcing current passes through the coil 77, and the magnetic field induced by the coil causes high speed rotation of the arc around the arcing electrode 76. The arc is cooled, loses energy, and is extinguished in the $SF_6$ gas with which the chamber is filled.

A similar action occurs when the switching contacts are moved to the off condition in response to appropriate operation of the switch control panel 7.

The outlet conductors 74 may be earthed by a simple onward movement of the switching contacts 83 from the auxiliary contacts 82, effected by further rotation of shaft 87 under control of the third drive mechanism 206 operated from control panel 7. Indeed, when the tee-off contacts 85 and outlet conductors 74 are so earthed, work can safely be done on the tee-off circuit even though one or both of the ring switches is still in the on position, so making the busbar contacts 59 to 61 live. It will be noted that each live busbar contact is separated from the associated one of earth contacts 90 by two gaps, both of which would have to be bridged by an arc struck in the insulating $SF_6$ medium if there were to be inadvertent connection from the busbar contacts to the outlet conductors 74. Such arcing is extremely unlikely.

Preferred constructions and dispositions of the parts of a ring main unit have been described in the drawings, but it will be appreciated that there are many modifications that can be made. However, the modular construction and the simplicity that results from the ability to use common parts in different locations of the unit is particularly advantageous. The modular construction also provides the further advantage that different units can be obtained by changing either the upper module or the lower module as required. Thus, the lower module, rather than incorporate two ring switches as shown may incorporate only a single ring switch. The upper module may incorporate circuit breakers for the tee-off switches as shown in FIG. 3, or such circuit breakers may be omitted.

An alternative form of upper module may make the unit extensible in any of its forms. This can quite simply be done by extending the busbars 56 to 58 as indicated by the phantom lines 56a to 58a in FIG. 6, and terminating those extensions in a set of auxiliary tee-off contacts in the form of conductors cast in situ in tapered bushings 304 to 306 that project from the wall structure of the upper module as indicated in phantom lines in FIG. 2.

When the unit is used to provide a single tee-off through conductors 74 and bushings 75 then the bushings 304 to 306 will have insulated caps fitted thereto. If a second tee-off is required, then another circuit breaker similar to the upper module and associated components may be mounted adjacent to the ring main unit and connected electrically to the auxiliary tee-off contacts bushings 304 to 306. This connection can be made without needing to open the upper chamber of the ring main unit, so that the gas filling thereof remains undisturbed.

Other modifications will be apparent.

We claim:

1. A three-phase electrical ring main unit comprising a lower chamber module having a wall structure formed form insulating resin material; three input contacts, one for each phase, mounted within the lower chamber; three lower switching contacts, each mounted within the lower chamber for movement between different switching positions; insulating closure means closing the top of the lower chamber; three output contacts, one for each phase, carried by and exposed on a lower face of the closure means; three busbar contacts, each electrically connected to a respective output contact, carried by and exposed on an upper face of the closure means; an upper chamber module having a wall structure formed from insulating resin material; means securing the upper chamber above the lower chamber such that the closure means of the lower chamber closes off the lower chamber from the upper chamber while maintaining the electrical connection to the respective output contacts within the lower chamber of the busbar contacts exposed on the upper face of the closure means, and thereby communicating the busbar contacts with the interior of the upper chamber; three tee-off contacts, one for each phase, mounted within the upper chamber; and three up switching contacts, each mounted in the upper chamber for movement between different switching positions; one switching position of the lower switching contacts effecting electrical connection between the input contacts and their associated output contacts; and one switching position of the upper switching contacts effecting electrical connection between the busbar contacts and their respective tee-off contacts.

2. A ring main unit according to claim 1 in which the insulating closure means is a base formed integrally with the wall structure of the upper chamber module, and closing an open top of the lower chamber module when these modules are secured together.

3. A ring main unit according to claim 1 in which the upper chamber module has an open top, which is closed by a lid secured to the wall structure of the upper chamber module.

4. A ring main unit according to claim 1 in which the outer surface of the wall structure of each chamber module is screened by an electrically conductive coating applied thereto.

5. A ring main unit according to claim 1 in which the input contacts have axes that are substantially parallel and lie in a first plane, the output contacts have axes that are substantially parallel and lie in a second plane substantially perpendicular to the first plane, the busbar contacts have axes that are substantially parallel and lie in a third plane substantially perpendicular to the second plane and at an angle to the first plane, and each busbar contact is electrically connected to its respective output contact by a respective busbar moulded in situ in the closure means.

6. A ring main unit according to claim 5 in which each respective busbar has an extension electrically connected to an auxiliary tee-off contact, the auxiliary tee-off contacts having conductors that pass through the wall structure of the upper chamber module in a direction different to the direction in which conductors connected to the tee-off contacts pass through the wall structure of the upper chamber module.

7. A ring main unit according to claim 1 in which the input contacts are electrically connected to supply conductors entering the lower chamber module through the wall structure thereof; the lower switching contacts are pivotally mounted on respective input contacts; three earthing contacts, one for each phase, are mounted within the lower chamber module and are electrically connected to earth connection points lying outside the lower chamber module; and the lower switching contacts are movable in unison between an off position, an on position wherein they connect respective input and output contacts, and an earth position wherein they connect respective input and earth contacts.

8. A ring main unit according to claim 1 in which the lower chamber also houses a second set of three input contacts, a second set of three lower switching contacts and a second set of three output contacts; in an arrangement that is substantially a mirror image of the first aforesaid input contacts, lower switching contacts and output contacts.

9. A ring main unit according to claim 1 in which the tee-off contacts are electrically connected to tee-off conductors entering the upper chamber module through the wall structure thereof; the upper switching contacts are pivotally mounted on respective tee-off contacts; three tee-off earthing contacts, one for each phase, are mounted within the upper chamber module and are electrically connected to tee-off earth connection points lying outside the upper chamber module; and the upper switching contacts are movable in unison between an off position, an on position wherein they connect respective busbar and tee-off contacts, and a tee-off earth position wherein they connect respective tee-off and tee-off earth contacts.

10. A ring main unit according to claim 8 in which arc-extinction means are associated with each busbar contact to extinguish any arc struck between the busbar contact and the associated upper switching contact when the latter moves from the on to the off position.

* * * * *